2 Sheets—Sheet 1.
N. LINSLEY, J. McCULLOCH & W. CLEMENT.
LEATHER-ROLLING MACHINE.
No. 171,574. Patented Dec. 28, 1875.
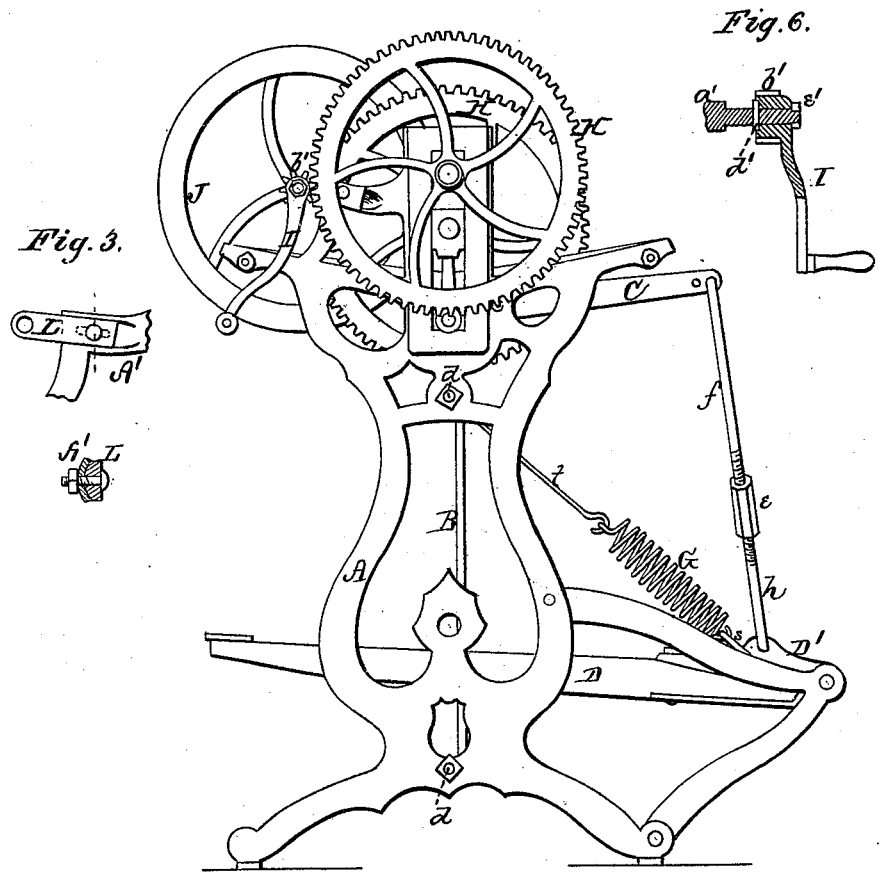
WITNESSES
Henry N. Miller
C. L. Everts
INVENTOR
N. Linsley, J. McCulloch, Wm. Clement
By Alexander Mason
Attorneys.

2 Sheets—Sheet 2.
N. LINSLEY, J. McCULLOCH & W. CLEMENT.
LEATHER-ROLLING MACHINE.
No. 171,574. Patented Dec. 28, 1875.
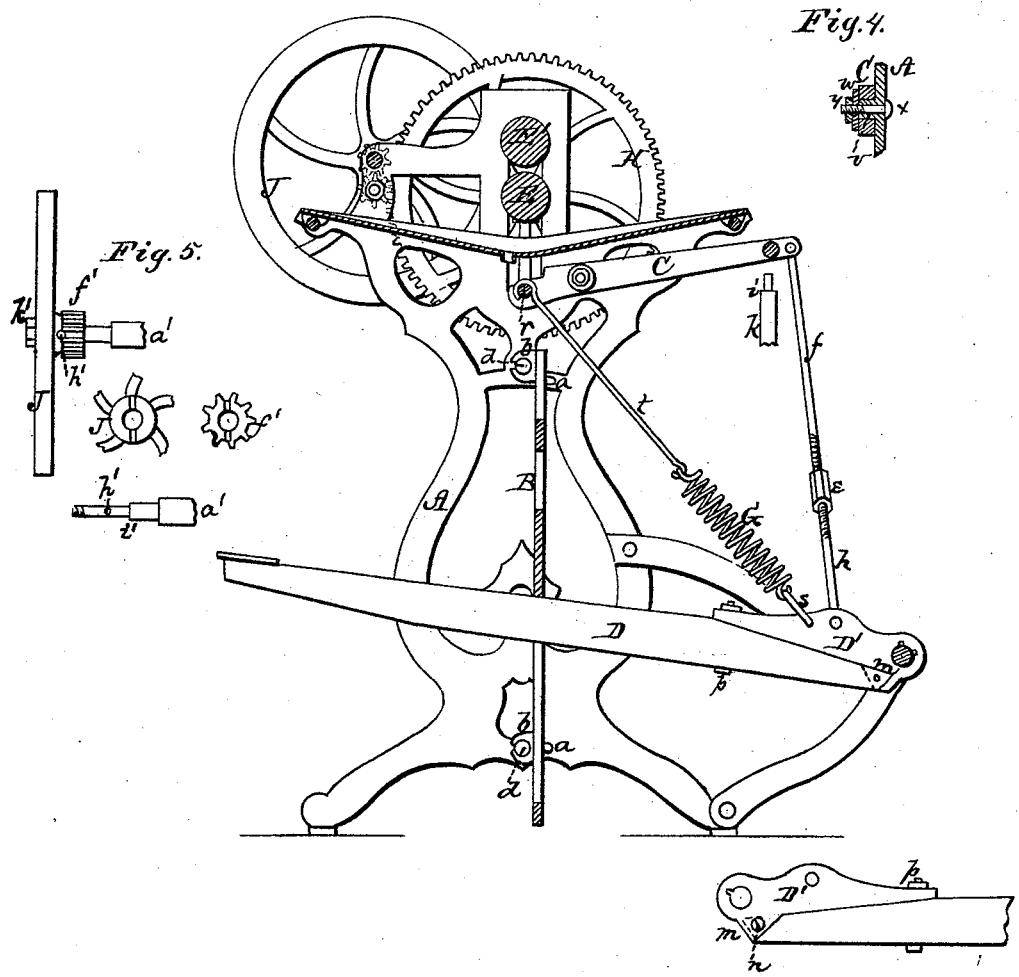
WITNESSES
INVENTOR

UNITED STATES PATENT OFFICE.

NEWTON LINSLEY, JOHN McCULLOCH, AND WILLIAM CLEMENT, OF LENA, ILLINOIS.

IMPROVEMENT IN LEATHER-ROLLING MACHINES.

Specification forming part of Letters Patent No. 171,574, dated December 28, 1875; application filed September 18, 1875.

*To all whom it may concern:*

Be it known that we, NEWTON LINSLEY, JOHN McCULLOCH, and WILLIAM CLEMENT, of Lena, in the county of Stephenson and in the State of Illinois, have invented certain new and useful Improvements in Machines for Rolling Leather; and do hereby declare that the following is a full, clear, and exact description thereof, reference being had to the accompanying drawings and to the letters of reference marked thereon, making a part of this specification.

Our invention relates to machines for rolling leather; and it consists in the construction and arrangement of the frame-work and operating parts thereof, as will be hereinafter more fully set forth.

In order to enable others skilled in the art to which our invention appertains to make and use the same, we will now proceed to describe its construction and operation, referring to the annexed drawings, in which—

Figure 1 is a side elevation of a leather-rolling machine embodying our invention. Fig. 2 is a vertical section of the same. Figs. 3, 4, 5, and 6 are detached views of parts thereof.

A A represent the side plates of the frame, and B the center plate connecting the same. The center-piece B is cast on each side with slotted lugs $b$, extending at right angles with the same. Through these slotted lugs are passed bolts $d$, which also pass through the side plates, thus fastening the center-piece to said side plates. On the inner sides of the side plates A are formed lugs $a$, to keep the center-piece in its place when secured by the bolts, and thus making a firm joint. C C are the levers which adjust the lower roller E up to the upper roller E'. These levers have at their outer ends rods $ff$, which are connected with the bent ends of a rod, $h$, by means of elongated nuts $e\ e$, the bent rod $h$ passing through the treadle-casting D, as shown. By means of the elongated nuts $e\ e$ the rods $f\ h$ may be lengthened or shortened, as required, to properly adjust the rollers. The upper ends of the rods $f$ are bent in hook form, and inserted in holes in the ends of the levers, in such a manner as to keep in place, and also allow of being sprung out of the same, to be screwed in or out of the nuts for the purpose of adjusting the rollers. The outer ends of the levers C C are connected by means of a stretcher-rod, $k$, which is turned with a shoulder, $i$, on each end, and inserted in holes near the ends of the levers, for the purpose of keeping the same in place. The treadle D is provided at its inner end with a casting, D', which has a socket, $m$, on the lower side to secure the end of the treadle, being held in place by a screw, $n$. The other end of the casting is secured by a bolt, $p$, passing through it and the treadle. It will thus be seen that the casting is secured to the treadle by a bolt which passes vertically, and a screw or bolt that passes horizontally, through them, with the end of the treadle bearing directly against the metal of the casting. By thus connecting the parts, as the bolt wears the treadle will at all times have a bearing at its front, and no lost motion is had in operation. The inner ends of the levers C are connected by a rod, $r$, from which a wire, $t$, connects with a spiral spring, G, and the other end of this spring is, by an open link, $s$, connected with the treadle-casting D'. One end of the open link $s$ passes through the end of the spring, and the other end of the link closed, with the ends entering a hole in the treadle-casting, for the purpose of making a loose joint. The levers C are pivoted upon hollow pins or gudgeons $v$, projecting from the side plates A, and are held against said side plates by means of washers $w$, held by bolts $x$ and nuts $y$, as shown in Fig. 4, the bolts passing through the side plates and hollow pins or gudgeons. On opposite ends of the two rollers E E' are cog-wheels H H, which are operated by suitable pinions on a shaft, $a'$. This shaft has at one end a crank, I, with a pinion, $b'$, formed at its inner end. The crank is fastened to the shaft by means of a pin, $d'$, passed through the shaft, and a notch on the end of the pinion, to prevent its turning when held in its place by a nut, $e'$, screwed on the end of the shaft. On the opposite end of the shaft $a'$ is a pinion, $f'$, and balance-wheel J, which are fastened to each other and to the shaft in the following manner: On the shaft $a'$ is a shoulder, $i'$, that the pinion $f'$ rests against, the other end having a cross-groove, as shown in Fig. 5, and a corresponding groove is made across the hub of the balance-wheel J. A pin, $h'$, is passed through the shaft $a'$, between the pinion and balance-wheel, in the grooves thereon. The balance-wheel is then held against this pin by a nut, $k'$, on the end of the shaft, in such a manner as to lock the pinion and balance-wheel together and secure both to the shaft $a'$. The end of the shaft $a'$ upon which the crank is placed has its bearing in an adjustable box, L, so that the pinion $b'$ may be made to mesh properly in the drive-wheel H on that side of the machine. The box L is adjusted by having a slot in the arm $A'$, that projects from the side plate, and to which the box is bolted, so that it can be moved in or out when loosened for adjustment. The box L is adjusted so as to bring it in line with the box on the other side plate by making the side of the box part of a circle, as shown in Fig. 3, and also the arm $A'$, that it is bolted against, made part of a circle, so that they will fit against each other, and allow the other end of the shaft to be raised or lowered while being brought in line, and held in place by the bolt that fastens it to the arm.

Having thus fully described our invention, what we claim as new, and desire to secure by Letters Patent, is—

1. The combination of the side plates A A, having lugs $a\ a$ formed on their inner sides, the center-piece B, formed with slotted lugs $b\ b$, and the bolts $d$, whereby the frame can be readily taken apart, all substantially as and for the purposes herein set forth.

2. The combination, with the levers C C and treadle-casting $D'$, of the rods $f\ f$, hooked into the ends of the levers, the bent rod $h$, passing through the casting, and the elongated nuts $e\ e$, connecting the rods, substantially as and for the purposes herein set forth.

3. The casting $D'$, provided with a socket, $m$, for securing the end of the treadle, and connected by the screw $n$ and bolt $p$, as set forth.

4. The crank I, having the pinion $b'$ formed therewith, and provided with a groove on the inner face, in combination with the perforated shaft $a'$, the pin $d'$, which passes through the shaft and lies in the groove in the pinion, and the nut $e'$, all as and for the purposes set forth.

5. The combination of the shaft $a'$, with shoulder $i'$ and pin $h'$, the grooved pinion $f'$, balance-wheel J, having grooved hub, and the nut $k'$, all substantially as and for the purposes herein set forth.

6. The combination of the slotted concave arm $A'$ and the convex box L, adjusted and fastened thereto, for supporting and adjusting the shaft $a'$, for the purposes herein set forth.

In testimony that we claim the foregoing we have hereunto set our hands this 23d day of July, 1875.

NEWTON LINSLEY.
JOHN McCULLOCH.
WILLIAM CLEMENT.

Witnesses:
ELIAS STAMM,
POLINA CLEMENT.